(12) United States Patent
Kobayashi et al.

(10) Patent No.: US 7,855,834 B2
(45) Date of Patent: Dec. 21, 2010

(54) MULTILAYERED PHASE DIFFERENCE PLATE AND PROJECTOR

(75) Inventors: Shuho Kobayashi, Okaya (JP);
Masayuki Oto, Zama (JP); Hiroshi Matsumoto, Chigasaki (JP)

(73) Assignee: Epson Toyocom Corporation, Tokyo (JP)

( * ) Notice: Subject to any disclaimer, the term of this patent is extended or adjusted under 35 U.S.C. 154(b) by 374 days.

(21) Appl. No.: 12/051,339

(22) Filed: Mar. 19, 2008

(65) Prior Publication Data

US 2008/0239487 A1 Oct. 2, 2008

(30) Foreign Application Priority Data

Mar. 27, 2007 (JP) ............................. 2007-080844
Mar. 5, 2008 (JP) ............................. 2008-054444

(51) Int. Cl.
*G02B 5/30* (2006.01)
*G03B 21/14* (2006.01)

(52) U.S. Cl. ..................... 359/494; 353/20; 359/497; 359/500

(58) Field of Classification Search ............... 349/6–9, 349/96; 353/20; 359/494, 497, 500
See application file for complete search history.

(56) References Cited

U.S. PATENT DOCUMENTS

| 6,856,304 | B1 * | 2/2005 | Hirakata et al. | 345/32 |
| 7,618,715 | B2 * | 11/2009 | Ushino et al. | 428/515 |
| 2008/0100759 | A1 * | 5/2008 | Tateno | 349/5 |

FOREIGN PATENT DOCUMENTS

| JP | A-2004-170853 | 6/2004 |
| JP | A-2006-201302 | 8/2006 |
| JP | A-2006-330282 | 12/2006 |

\* cited by examiner

*Primary Examiner*—Frank G Font
(74) *Attorney, Agent, or Firm*—Oliff & Berridge, PLC

(57) ABSTRACT

There is provided a multilayered phase difference plate that serves as a half-wavelength phase difference plate in the range of 400 nm to 700 nm by bonding together a first phase difference plate and a second phase difference plate in a manner that their respective optical axes intersect each other. The multilayered phase difference plate obtains a high incident light polarization conversion efficiency because the respective plate thicknesses of the first and second phase difference plates are within a range such that phase difference deviation amounts become offset by each other.

19 Claims, 12 Drawing Sheets

MULTILAYERED PHASE DIFFERENCE PLATE AND PROJECTOR

CROSS-REFERENCE TO RELATED APPLICATIONS

The entire disclosure of Japanese Patent Application Nos: 2007-080844, filed Mar. 27, 2007, and 2008-054444, filed Mar. 5, 2008, are expressly incorporated by reference herein.

BACKGROUND

1. Technical Field

The present invention relates to a multilayered phase difference plate formed by bonding multiple quartz crystal plates together, and a projector including this multilayered phase difference plate.

2. Related Art

A multilayered phase difference plate as disclosed in Patent Document 1 (JP-A-2004-170853) is known as an optical element for use in a liquid crystal projector or the like and for arranging the polarization of a light beam incident from a light source.

This multilayered phase difference plate includes two phase difference plates formed of quartz crystal substrates. The two phase difference plates are bonded together in a manner that the respective crystal optical axes (hereafter referred to as "optical axes") thereof intersect each other. This multilayered phase difference plate serves as a half-wavelength phase difference plate and converts a polarization plane of an incident light beam into a 90°-rotated polarization plane. This incident light beam is a light beam in any one of a three-color wavelength range (approximately 400 nm to 700 nm), a blue wavelength range (approximately 400 nm to 500 nm), a green wavelength range (approximately 500 nm to 600 nm), and a red wavelength range (approximately 600 nm to 700 nm) according to the light source.

As disclosed in Patent Document 2 (JP-A-2006-330282), a liquid crystal projector or the like obtains light beams in the above-described multiple wavelength ranges from a light source using various optical elements, provides gradations to the obtained light beams using a liquid crystal shutter, and then synthesizes the resultant light beams again to project picture information. These optical elements forming an optical path include a number of phase difference plates. Incident light beams to these phase difference plates are in any one of the above-described wavelength ranges. Note that the ranges of the above-described wavelength ranges are one example and that ranges other than the above-described wavelength ranges are set according to the design of a liquid crystal projector.

SUMMARY

With regard to the multilayered phase difference plate disclosed in Patent Document 1, the plate thicknesses of both phase difference plates thereof are set to 100 μm as the optimal condition of an embodiment. Also, the cut directions of both phase difference plates from a raw quartz crystal are set to Z-cut and the optical axis azimuths of the two phase difference plates are set to 19° and 64°, respectively. According to this design, the polarization conversion efficiency is increased in a wavelength range of 400 nm to 700 nm.

However, the above-described related-art multilayered phase difference plate is insufficient in its ability to further increase the polarization conversion efficiency in wavelength ranges of incident light beams. The polarization conversion efficiency refers to, for example, the proportion of converted P-waves if an attempt is made to convert P-waves into S-waves. If all the P-waves are polarization-converted into S-waves, the polarization conversion efficiency is represented by an ideal value 1.00. As the polarization conversion efficiency gets closer to the ideal value 1.00, the loss of the quantity of light beams passed through the multilayered phase difference plate is reduced. This is favorable to manufacturing liquid crystal projectors having bright pictures.

While a multilayered phase difference plate for handling incident light beams in various wavelength ranges is used in a liquid crystal projector, no means has been proposed for increasing the polarization conversion efficiency so that the polarization conversion efficiency is optimum for each of the above-described various wavelength ranges.

In view of the above-described problems, an object of the present invention is to provide a multilayered phase difference plate that obtains a higher polarization conversion efficiency than those of related-art multilayered phase difference plates and that is favorable to each of the wavelength ranges of light beams, and a projector including such a multilayered phase difference plate.

The present invention has been made to solve at least part of the above-described problems and is realized as the following aspects or application examples.

A multilayered phase difference plate according to a first application example is a multilayered phase difference plate formed by bonding a first phase difference plate and a second phase difference plate together, the first and second phase difference plates being a plurality of quartz crystal plates, and is characterized in that an optical axis azimuth $\theta a$ of the first phase difference plate and an optical axis azimuth $\theta b$ of the second phase difference plate have a relation of $\theta b = \theta a + \alpha$, $0° < \theta a < 45°$, and $40° < \alpha \leq 50°$, and if $\Gamma a$ represents a phase difference of the first phase difference plate and is assumed to be 180°, $\Delta \Gamma a$ represents a deviation amount of the phase difference $\Gamma a$ from a design target value, $\Gamma b$ represents a phase difference of the second phase difference plate and is assumed to be 180°, and $\Delta \Gamma b$ represents a deviation amount of the phase difference $\Gamma b$ from a design target value, Formula 1 below is satisfied.

$$\Delta \Gamma b = \cos^{-1}\left(1 - \frac{(1-\cos(4\theta a))(1-\cos\Delta\Gamma a)}{(1-\cos 4(\alpha - \theta a))}\right) \quad \text{Formula (1)}$$

The first and second phase difference plates are obtained by grinding a quartz crystal substrate cut from a raw quartz crystal and are manufactured so that the thickness thereof before bonding becomes the thickness design target value. The amount of deviation of the manufactured thickness value from the thickness design target value affects the amounts of deviations of the phase differences of light beams passed through the first and second phase difference plates from the respective target values. If the phase difference of the second phase difference plate is controlled with respect to the amount of deviation from the phase difference of the first phase difference plate from the target value thereof, the amount of deviation of the phase difference of a light beam passed through the above-described multilayered phase difference plate after bonding from the target value thereof is reduced. This allows an increase in the polarization conversion efficiency.

For this purpose, a means has been found to obtain the deviation amount $\Delta \Gamma b$ of the second phase difference plate $\Gamma b$ from the design target value thereof, from the deviation amount ΔΓa of the first phase difference plate Γa from the design target value thereof and the optical axis azimuth θb of the second phase difference plate. Then, using this means, the first phase difference plate having the deviation amount ΔΓa of the phase difference Γa from the design target value thereof and the second phase difference plate having the deviation amount ΔΓb of the phase difference Γb from the design target value thereof that is optimum for the deviation amount ΔΓa are bonded together and multilayered. The multilayered phase difference plate obtained using this means offsets the deviation amount ΔΓa of the phase difference Γa from the design target value thereof by the deviation amount ΔΓb of the phase difference Γb from the design target value thereof. Thus, the multilayered phase difference plate obtains a high polarization conversion efficiency.

The multilayered phase difference plate according to the above-described application example is also characterized in that a plate thickness of the first phase difference plate can be in a range of 24 μm to 31 μm and a plate thickness of the second phase difference plate can be in a range of 24 μm to 31 μm.

The multilayered phase difference plate obtained by bonding together the first phase difference plate having the plate thickness in the above-described range and the second phase difference plate having the plate thickness in the above-described range using the method according to the above-described application example obtains a higher polarization conversion efficiency with respect to an incident light beam in the wavelength range of 400 nm to 700 nm than that of a related-art multilayered phase difference plate.

The multilayered phase difference plate according to the above-described application example is further characterized in that a plate thickness of the first phase difference plate can be in a range of 21 μm to 26 μm and a plate thickness of the second phase difference plate can be in a range of 21 μm to 26 μm.

The multilayered phase difference plate obtained by bonding together the first phase difference plate having the plate thickness in the above-described range and the second phase difference plate having the plate thickness in the above-described range using the method according to the above-described application example obtains a higher polarization conversion efficiency with respect to an incident light beam in the wavelength range of 400 nm to 500 nm than that of a related-art multilayered phase difference plate.

The multilayered phase difference plate according to the above-described application example is further characterized in that a plate thickness of the first phase difference plate can be in a range of 25 μm to 35 μm and a plate thickness of the second phase difference plate can be in a range of 25 μm to 35 μm.

The multilayered phase difference plate obtained by bonding together the first phase difference plate having the plate thickness in the above-described range and the second phase difference plate having the plate thickness in the above-described range using the method according to the above-described application example obtains a higher polarization conversion efficiency with respect to an incident light beam in the wavelength range of 500 nm to 600 nm than that of a related-art multilayered phase difference plate.

The multilayered phase difference plate according to the above-described application example is further characterized in that a plate thickness of the first phase difference plate can be in a range of 24 μm to 47 μm and a plate thickness of the second phase difference plate can be in a range of 24 μm to 47 μm.

The multilayered phase difference plate obtained by bonding together the first phase difference plate having the plate thickness in the above-described range and the second phase difference plate having the plate thickness in the above-described range using the method according to the above-described application example obtains a higher polarization conversion efficiency with respect to an incident light beam in the wavelength range of 600 nm to 700 nm than that of a related-art multilayered phase difference plate.

A projector according to this application example is characterized in that the projector can include the multilayered phase difference plate according to any one of the above-described application examples.

The projector including the multilayered phase difference plate described above obtains a higher polarization conversion efficiency than that of the related-art and thereby increases the light use efficiency. Consequently, even if the projector employs a light source with the same brightness, it displays brighter pictures. Specifically, in a projector in which multiple light sources having different wavelength ranges are combined and used, a phase difference plate having a high polarization conversion efficiency for each of the wavelength ranges of the light sources is used, thereby increasing the light use efficiency.

DETAILED DESCRIPTION OF EMBODIMENTS

Embodiments of a multilayered phase difference plate according to the present invention will now be described with reference to the accompanying drawings. The plate thickness, optical axis azimuth, and polarization conversion efficiency, and the like of a multilayered phase difference plate according to each embodiment below are obtained according to Formula (2), Formula (3), the Mueller matrix equation, and the like.

$$\Gamma = 2\pi d(Ne - No)/\lambda \qquad \text{Formula (2)}$$

$$T = 4(\sin^2 \theta)(\cos^2 \theta)(\sin^2 \Gamma/2) \qquad \text{Formula (3)}$$

In Formulas (2) and (3), $\Gamma$ represents a phase difference, d represents a plate thickness, Ne represents an extraordinary ray refractive index, No represents an ordinary ray refractive index, $\lambda$ represents a wavelength, T represents a polarization conversion efficiency, and $\theta$ represents an optical axis azimuth.

First, and in accordance with the above-described formulas, the polarization conversion efficiency is obtained for each of the selected wavelengths at intervals of 5 nm. The differences between the obtained polarization conversion efficiencies and the ideal value 1.00 are defined as divergence values. Then, the divergence values with respect to the wavelengths in a target wavelength range are accumulated to obtain a cumulative divergence value.

First Embodiment

Figure 1:
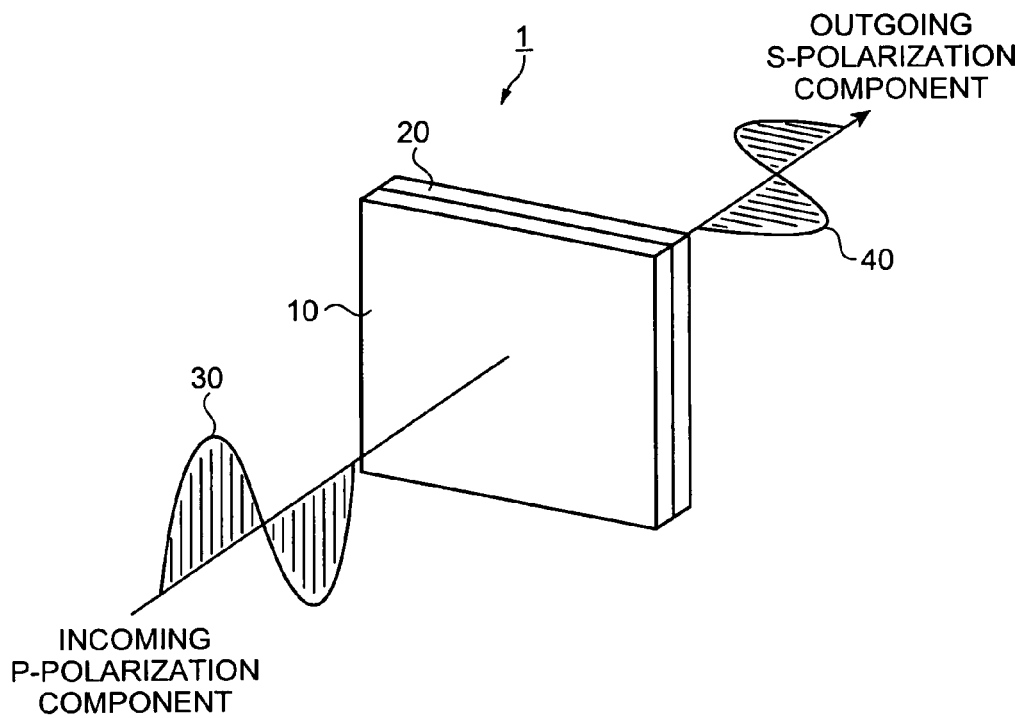
FIG. 1 is a drawing showing polarization of a multilayered phase difference plate.
Figure 2:
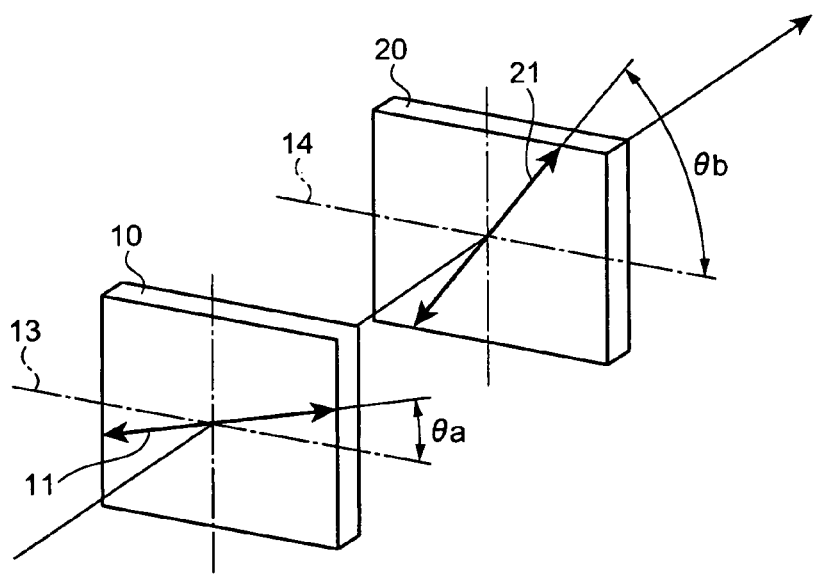
FIG. 2 is a drawing showing optical axis azimuths of the multilayered phase difference plate.

FIG. 1 is an explanatory drawing showing a multilayered phase difference plate according to a first embodiment. FIG. 1 is a drawing showing polarization conversion of incident light. FIG. 2 is a drawing showing optical axis azimuths. As shown in FIG. 1, a multilayered phase difference plate 1 includes a first phase difference plate 10 and a second phase difference plate 20. As shown in FIG. 2, the first and second phase difference plates 10 and 20 are bonded together in a manner that optical axes 11 and 21 intersect each other.

Figure 3:
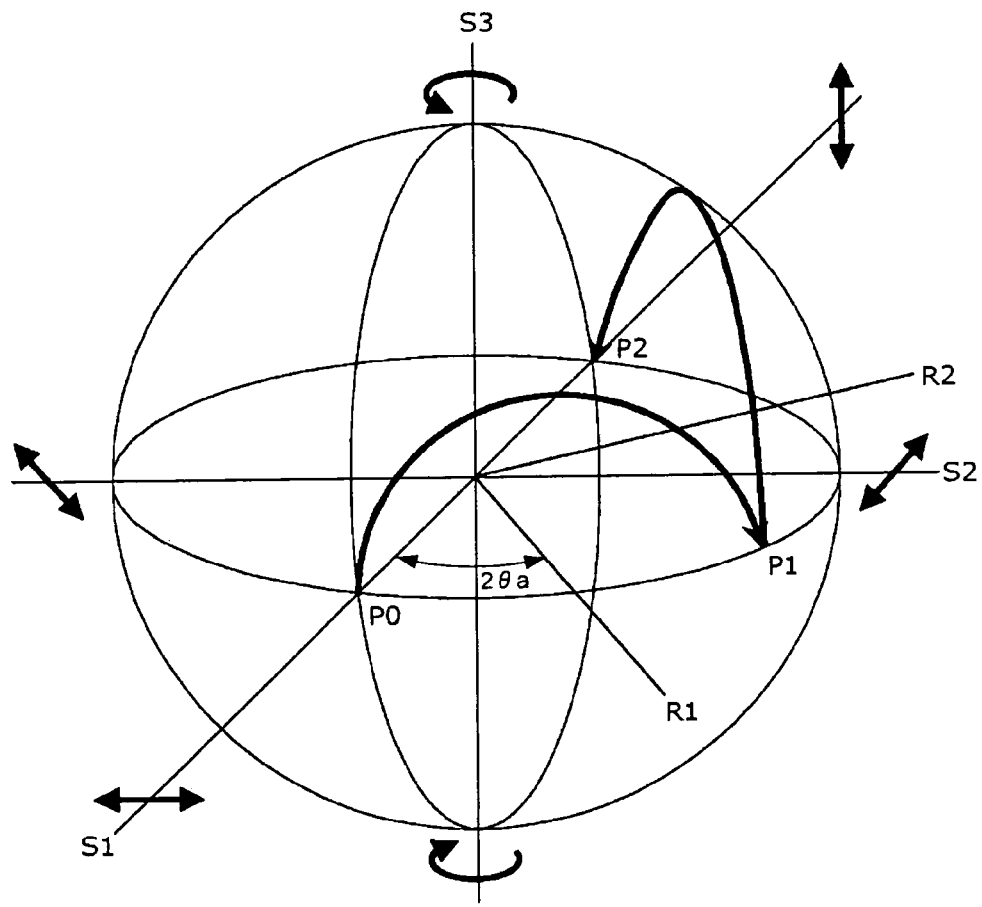
FIG. 3 is a drawing showing a Poincare sphere.

FIG. 3 shows a Poincare sphere of a half-wavelength phase difference plate according to the invention described in this application. A method for minimizing a deviation of the phase difference of the half-wavelength phase difference plate will now be described using this Poincare sphere. First, the setting conditions are as follows: the incident polarization plane is the horizontal direction of FIG. 3, a phase difference $\Gamma a$ of a first phase difference plate is 180°; the optical axis azimuth of the first phase difference plate is represented by $\theta a$; a phase difference $\Gamma b$ of a second phase difference plate is 180°; and the optical axis azimuth of the second phase difference plate is represented by $\theta b$. Then, the polarization states of light beams passed through the first and second phase difference plates are examined as follows.

The function of the half-wavelength phase difference plate is to rotate the polarization plane by approximately 90°. This means that the half-wavelength phase difference plate is moved from the position of coordinates P0 (S1, S1, S1)=(1, 0, 0) to coordinates P2=(−1, 0, 0) on the Poincare sphere. Here, assume that the start point is the coordinates P0 as an intersection of an S1 axis and the spherical surface. Next, a rotation axis R1 is set in a position reached by rotating the S1 axis by $2\theta a$ counterclockwise. A position reached by rotating P0 by 180° clockwise with the R1 axis used as a rotation axis is represented by P1. Next, a rotation axis R2 is set in a position reached by rotating the S1 axis by $2\theta b$ counterclockwise. A position reached by rotating P1 by 180° clockwise with the R2 axis used as a rotation axis is represented by P2.

From the above description, in order for the P2 to reach (−1, 0, 0), it is sufficient for the optical axis azimuths $\theta a$ and $\theta b$ to meet the condition below. Note that a phase difference $\alpha$ is set to ±5° of the set value in consideration of the bonding accuracy.

$$\theta b = \theta a + \alpha \qquad \text{Formula (4)}$$

$$40° < \alpha < 50° \qquad \text{Formula (5)}$$

Figure 4:
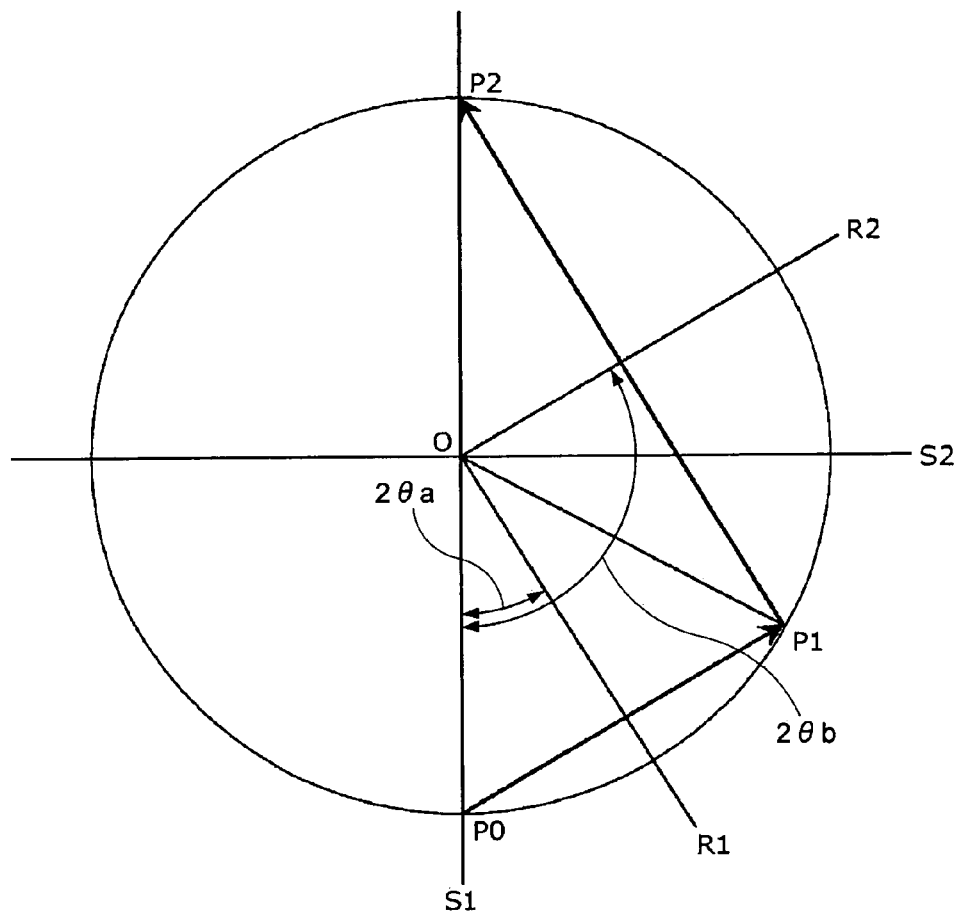
FIG. 4 is a diagram of the Poincare sphere shown from an S3 axis direction.

FIG. 4 shows a diagram of the Poincare sphere of FIG. 3 seen from an S3 axis. The rotation axis R1 used when the polarization plane is moved from the coordinates P0 to the coordinates P1 is located in a position reached by rotating the S1 axis by $2\theta a$. The rotation axis R2 used when the polarization plane is moved from the coordinates P1 to the coordinates P2 is located in a position reached by rotating the S1 axis by $2\theta b$. Therefore, if the center of the Poincare sphere is represented by O, an angle formed by the coordinates P0, coordinates P1, and center O is represented by $\angle$P0-O-P1 and an angle formed by the coordinates P1, coordinates P2, and center O is represented by $\angle$P1-O-P2, the following formulas are obtained.

$$\angle P0\text{-}O\text{-}P1 = 4\theta a \qquad \text{Formula (6)}$$

$$\angle P1\text{-}O\text{-}P2 = 4\alpha - 4\theta a \qquad \text{Formula (7)}$$

Figure 5:
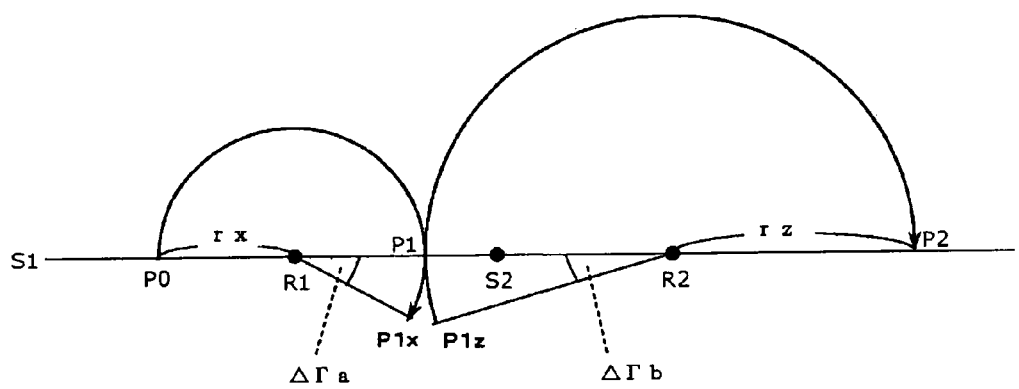
FIG. 5 is a diagram linearly showing polarized light on an equatorial plane of the Poincare sphere.

FIG. 5 is a diagram linearly indicating phase differences in a case where the polarized light is moved from the coordinates P0 to the coordinates P2 on the equatorial plane of the Poincare sphere shown in FIG. 3. Although the equatorial plane extending from the coordinates P0 through the coordinates P1 until the coordinates P2 should be represented by a curve, it is represented as a straight line for the sake of clarity. rx is a turning radius in a case where the polarized light is moved from the coordinates P0 to the coordinates P1 with the R1 axis used as the rotation axis. rz is a turning radius in a case where the polarized light is moved from the coordinates P1 to the coordinates P2 with the R2 axis used as the rotation axis. The first phase difference plate is manufactured so that the polarized light is moved from the P0 to P1 using the turning radium r1 on the Poincare sphere; however, if the manufacturing accuracy in thickness of the phase difference plate deviates from the designed value thereof, the polarized light cannot be moved to P1 but is moved to P1x. The second phase difference plate is manufactured so that the polarized light is moved from the P1 to P2 using the turning radium rz. If the second phase difference plate is manufactured so that P1 becomes P1z, P1−P1x=P1−P1z will result. Thus, the polarized light is moved to the P2 position. As a result, a multilayered phase difference plate accurately serving as a half-wavelength phase difference plate is provided.

Assuming that L=P1−P1x=P1−P1z, $$L = 2(rx)^2(1 - \cos \Delta \Gamma a) \qquad \text{Formula (8)}$$

$$L = 2(rz)^2(1 - \cos \Delta \Gamma b) \qquad \text{Formula (9)}$$

From Formulas (8) and (9), $$2(rx)^2(1 - \cos \Delta \Gamma a) = 2(rz)^2(1 - \cos \Delta \Gamma b) \qquad \text{Formula (10)}$$

If the radius of the Poincare sphere is represented by k, $$(2rx)^2 = 2k^2 - 2k^2 \cos 4\theta a$$

$$2(rx)^2 = k^2 - k^2 \cos 4\theta a \quad \text{Formula (11)}$$

$$(2rz)^2 = 2k^2 - 2k^2 \cos 4(\alpha - \theta a)$$

$$2(rz)^2 = k^2 - k^2 \cos 4(\alpha - \theta a) \quad \text{Formula (12)}$$

From Formulas (10), (11), and (12), $$(k^2 - k^2 \cos 4\theta a)(1 - \cos \Delta \Gamma a) = (k^2 - k^2 \cos 4(\alpha - \theta a))(1 - \cos \Delta \Gamma b)$$

$$(1 - \cos 4\theta b)(1 - \cos \Delta \Gamma a) = (1 - \cos 4(\alpha - \theta a))(1 - \cos \Delta \Gamma b)$$

$$1 - \cos \Delta \Gamma b = (1 - \cos 4\theta a)(1 - \cos \Delta \Gamma a)/(1 - \cos 4(\alpha - \theta a))$$

From the above formulas, the deviation amount $\Delta \Gamma b$ is derived from the formula below.

$$\Delta \Gamma b = \cos^{-1}\left(1 - \frac{(1 - \cos(4\theta a))(1 - \cos \Delta \Gamma a)}{(1 - \cos 4(\alpha - \theta a))}\right) \quad \text{Formula (1)}$$

If Formula 1 is applied to a multilayered phase difference plate formed by combining and bonding together multiple phase difference plates, the multiple phase difference plates are combined so that these plates each have a phase difference $\Delta \Gamma$ that is optimum for each other. By selecting Formula (1), the phase difference of the multilayered phase difference plate matches the target value, thereby increasing the polarization conversion efficiency most.

Figure 6:
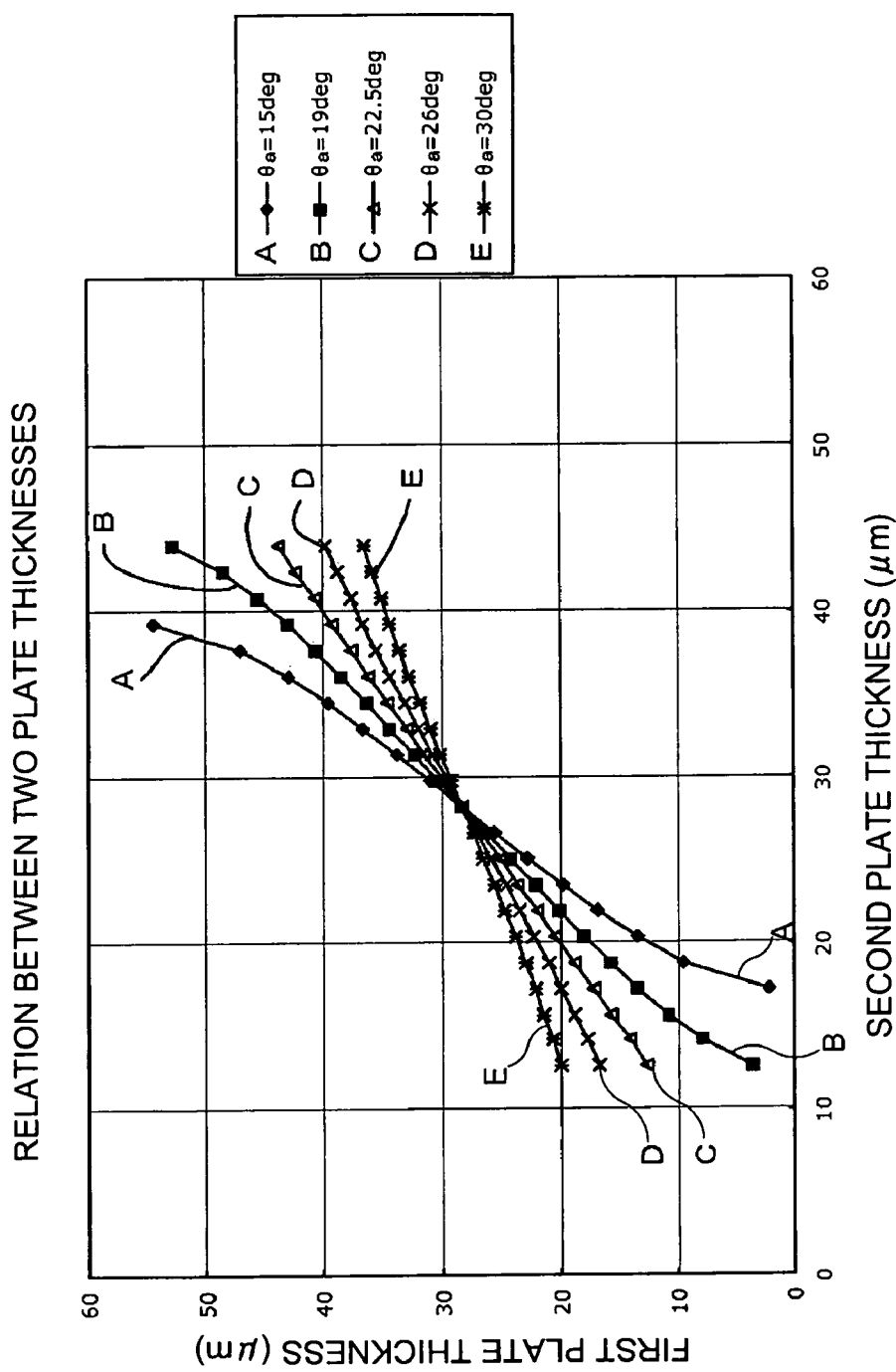
FIG. 6 is a graph showing favorable combinations of plate thicknesses of two phase plates according to the present invention.

The plate thicknesses of the first and second phase difference plates of the multilayered phase difference plate having the optimum phase difference obtained from Formula (1) are obtained from Formulas (2) and (3). The obtained plate thicknesses are represented as a graph in FIG. 6.

As seen in the graph, there are various favorable combinations for each optical axis azimuth. Only for the optical axis azimuth $\theta a$ of $22.5°$, the two plate thicknesses are always the same and optimum without depending on the optical axis azimuth $\theta a$.

Figure 7:
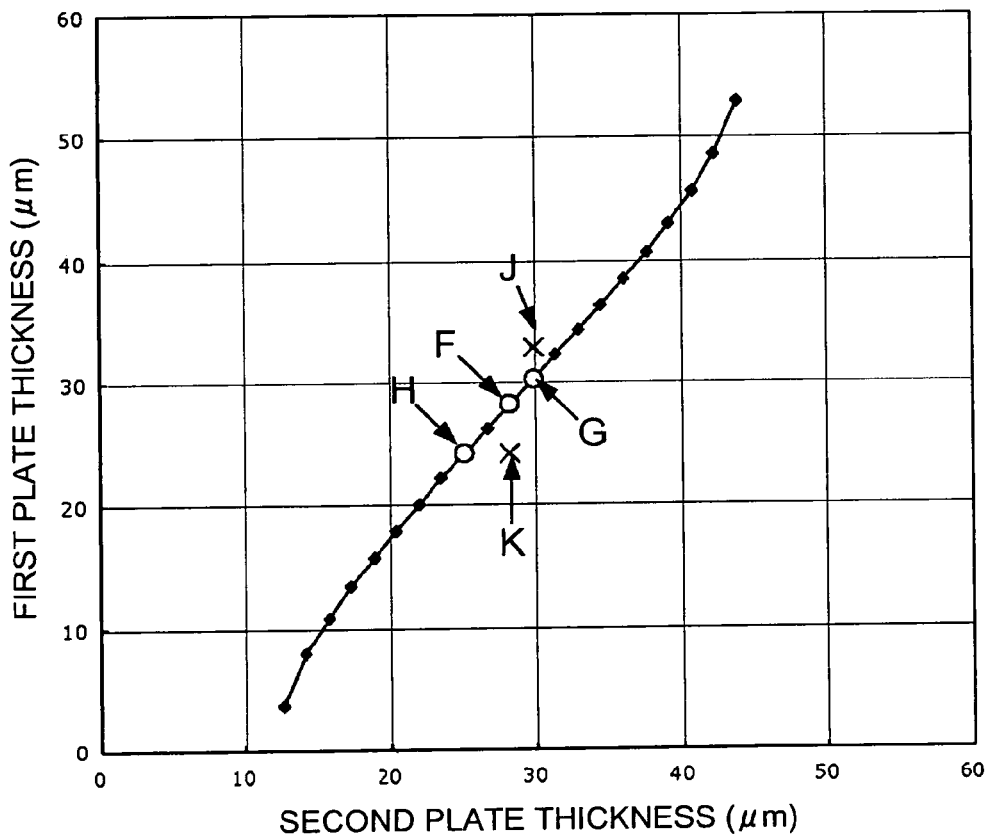
FIG. 7 is a graph showing the favorable combinations of plate thicknesses of two phase plates according to the present invention and comparative examples.

Table 1 shows the polarization conversion efficiencies of the multilayered phase difference plate formed by bonding together a phase difference plate having a first plate thickness T1 and a phase difference plate having a second plate thickness T2. These are results of the polarization conversion efficiencies obtained by using combinations of the plate thicknesses according to the conditions shown in FIG. 7. For F, G, and H, the plate thicknesses are combined on a line indicating the optimum conditions; for J and K, the plate thicknesses are combined outside the line. That is, J and K represent multilayered phase difference plates having the combinations of the plate thicknesses that are not optimum. A polarization conversion efficiency loss refers to the proportion of light beams that does not become converted and is represented by a gray divergence range 56 shown in FIG. 8. As this proportion is increased, the polarization conversion efficiency of the multilayered phase difference plate is reduced. Therefore, it can be said that a multilayered phase difference plate preferably has a small polarization conversion efficiency loss. Specifically, it can be said that F, G, and H obtain smaller polarization conversion efficiency losses than J and K and therefore have higher polarization conversion efficiencies. In other words, a multilayered phase difference plate combined under the conditions matching the solid line shown in FIG. 7, that is, using Formula (1), provide a higher polarization conversion efficiency.

TABLE 1

|   | T2 (μm) | T1 (μm) | Polarization conversion efficiency loss |
|---|---------|---------|------------------------------------------|
| F | 28.2    | 28.2    | 1.3% |
| G | 29.8    | 30.2    | 1.8% |
| H | 25.1    | 24.2    | 2.3% |
| J | 29.8    | 32.9    | 3.6% |
| K | 28.2    | 24.2    | 3.2% |

An embodiment with respect to the range of a plate thickness favorable for the wavelength dependency of a multilayered phase plate optimally combined using Formula (1) will now be described.

The multilayered phase difference plate 1 shown FIG. 1 is formed in a manner that the respective plate thicknesses of the first and second phase difference plates 10 and 20 are in the range of 23.80 μm to 31.39 μm. The first and second phase difference plates 10 and 20 are formed in approximately the same plate thicknesses. The first and second phase difference plates 10 and 20 are formed of Y-cut quartz crystal substrates having the optical axes 11 and 21, respectively, along the plate surface.

In the multilayered phase difference plate 1, the optical axis azimuth $\theta a$ of the first phase difference plate 10 and the optical axis azimuth $\theta b$ of the second phase difference plate 20 are set according to Formulas (2) and (3), the Mueller matrix formula, and the like. The optical axis azimuths $\theta a$ and $\theta b$ represent the angles that the optical axes 11 and 12 form with vibration planes 13 and 14 horizontal to incident light, counterclockwise from the vibration planes 13 and 14. Here, the settable ranges of the optical axis azimuths $\theta a$ and $\theta b$ with respect to the range of the plate thicknesses of the first and second phase difference plates 10 and 20 are shown.

TABLE 2

| Plate thickness (μm) | $\theta a(°)$ | $\theta b(°)$ |
|---|---|---|
| 23.80 | 21.7 to 23.3 | 66.7 to 68.3 |
| 27.73 | 12.0 to 33.0 | 57.0 to 78.0 |
| 31.39 | 21.4 to 23.6 | 66.4 to 68.6 |

Table 2 shows the settable ranges of the optical axis azimuths $\theta a$ and $\theta b$ with respect to the above-described three plate thicknesses of the first and second phase difference plates 10 and 20. As shown in Table 2, for the plate thickness of 23.80 μm, which is the lower limit, the optical axis azimuth $\theta a$ is in the range of 21.7° to 23.3° and the optical axis azimuth $\theta b$ is in the range of 66.7° to 68.3°. For the plate thickness of 27.73 μm, which is approximately the center value, the optical axis azimuth $\theta a$ is in the range of 12.0° to 33.0° and the optical axis azimuth $\theta b$ is in the range of 57.0° to 78.0°. For the plate thickness of 31.39 μm, which is the upper limit, the optical axis azimuth $\theta a$ is in the range of 21.4° to 23.6° and the optical axis azimuth $\theta b$ is in the range of 66.4° to 68.6°.

Note that the optical axis azimuth $\theta b$ is a value obtained by adding $\alpha$ to the set value of the optical axis azimuth $\theta a$. The above-described optical axis azimuth $\theta b$ is calculated on the assumption that the angle $\alpha$ formed by the optical axis azimuths $\theta a$ and $\theta b$ is 45°. However, the angle $\alpha$ formed by the optical axis azimuths $\theta a$ and $\theta b$ is not limited to 45° and may be set to an angle other than 45° according to the combination of the plate thickness and the optical axis azimuth $\theta a$.

According to the above-described configuration, the multilayered phase difference plate 1 shown in FIG. 1 serves as a half-wavelength phase difference plate. When linearly polarized light 30 as a p-polarization component of incident light enters the multilayered phase difference plate 1, the phase of the linearly polarized light 30 is shifted by 180°, thereby rotating the polarization plane by 90°. Thus, the linearly polarized light 30 is polarization-converted into linearly polarized light 40 as an s-polarization component so that the linearly polarized light 40 goes out of the multilayered phase difference plate 1.

A result of a comparison between the efficiency of polarization conversion from the p-polarization component to the s-polarization component performed by the multilayered phase difference plate 1 according to the first embodiment and that of a related-art multilayered phase difference plate will now be described using the above-described cumulative divergence value.

Figure 8:
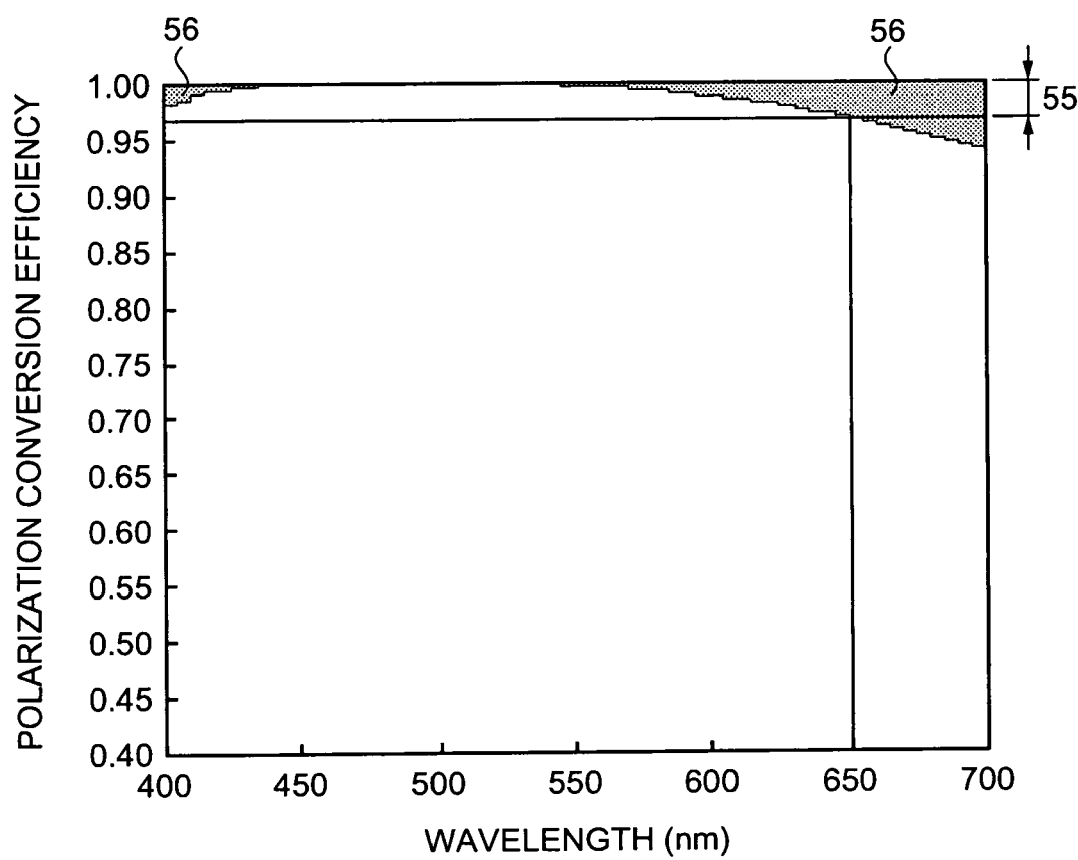
FIG. 8 is a graph showing cumulative divergence values according to an embodiment of the present invention.

FIG. 8 is a graph used to determine the cumulative divergence value. The cumulative divergence value is obtained based on the polarization conversion efficiency of incident light within a desired range of wavelengths and taken at intervals of 5 nm. The difference between the obtained polarization conversion efficiency and the ideal value 1.00 is the divergence value. For example, for a wavelength of 650 nm in FIG. 8, the polarization conversion efficiency is 0.97 and a divergence value 55 is 1.00−0.97=0.03. The cumulative divergence value is obtained by determining the divergence values across the desired wavelength range and summing the results. The cumulative divergence value is represented by a rough area 56 in the graph of FIG. 8. When the cumulative divergence value becomes smaller, the polarization conversion efficiency becomes higher.

Figure 9:
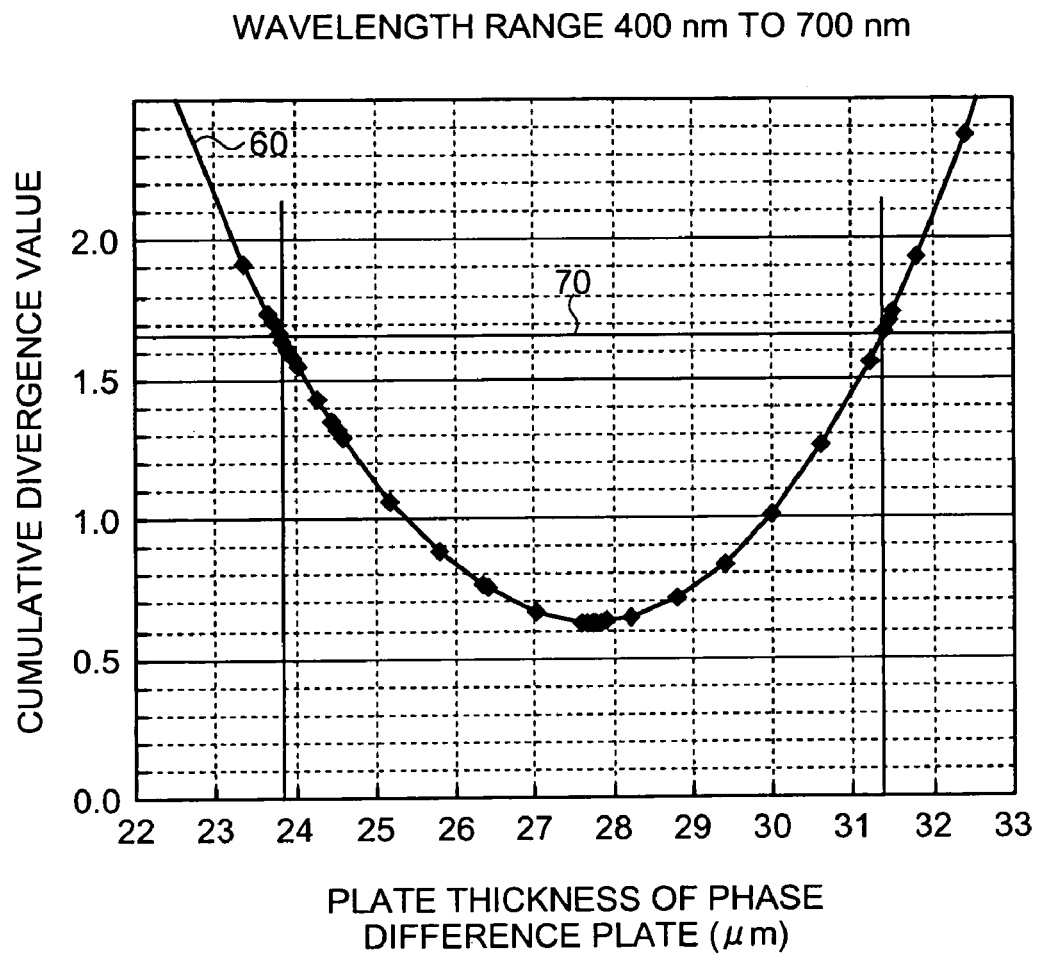
FIG. 9 is a graph comparing cumulative divergence values of a multilayered phase difference plate according to a first embodiment and cumulative divergence values of a related-art multilayered phase difference plate.

FIG. 9 is a graph comparing the polarization conversion efficiency of the multilayered phase difference plate according to the first embodiment and that of a related-art multilayered phase difference plate in the wavelength range of 400 nm to 700 nm using the cumulative divergence value with respect to the plate thickness of the phase difference plate. The cumulative divergence value is calculated on the assumption that the first and second phase difference plates are approximately the same thickness. Here, the lateral axis of FIG. 9 represents the plate thickness of the phase difference plate and the vertical axis of FIG. 9 represents the cumulative divergence value.

In FIG. 9, a curve 60 is a line obtained by linking the cumulative divergence values pursuant to the first embodiment and with respect to the plate thicknesses. A straight line 70 is a line obtained by plotting the cumulative divergence values of the related-art multilayered phase difference plate. When the curve 60 is located below the straight line 70, the cumulative divergence value of the multilayered phase difference plate according to the first embodiment is smaller than that of the related-art multilayered phase difference plate. Note that the above-described related-art polarization conversion efficiency is calculated according to Patent Document 1.

As shown in FIG. 9, it is understood that the cumulative divergence value of the multilayered phase difference plate 1 according to the first embodiment is smaller than that of the related-art multilayered phase difference plate when the plate thicknesses of the first and second phase difference plates 10 and 20 are in the range of 24 μm to 31 μm and therefore the polarization conversion efficiency of the multilayered phase difference plate 1 is higher than that of the related-art multilayered phase difference plate. If the first and second phase difference plates utilize this plate thickness range and are combined using Formula (1), the polarization conversion efficiency is further increased.

The multilayered phase difference plate 1 having the above-described plate thickness obtains a higher polarization conversion efficiency than that of the related-art multilayered phase difference plate in the range of 400 nm to 700 nm. While the above-described optimization of the plate thickness range is on the assumption that the two phase plates are approximately the same, an even higher polarization conversion efficiency is obtained in the range of 400 nm to 700 nm by further optimizing the two plate thicknesses in view of Formula (1).

Hereafter, an example of a polarization conversion optical element including the multilayered phase difference plate according to the first embodiment will be described.

Figure 10:
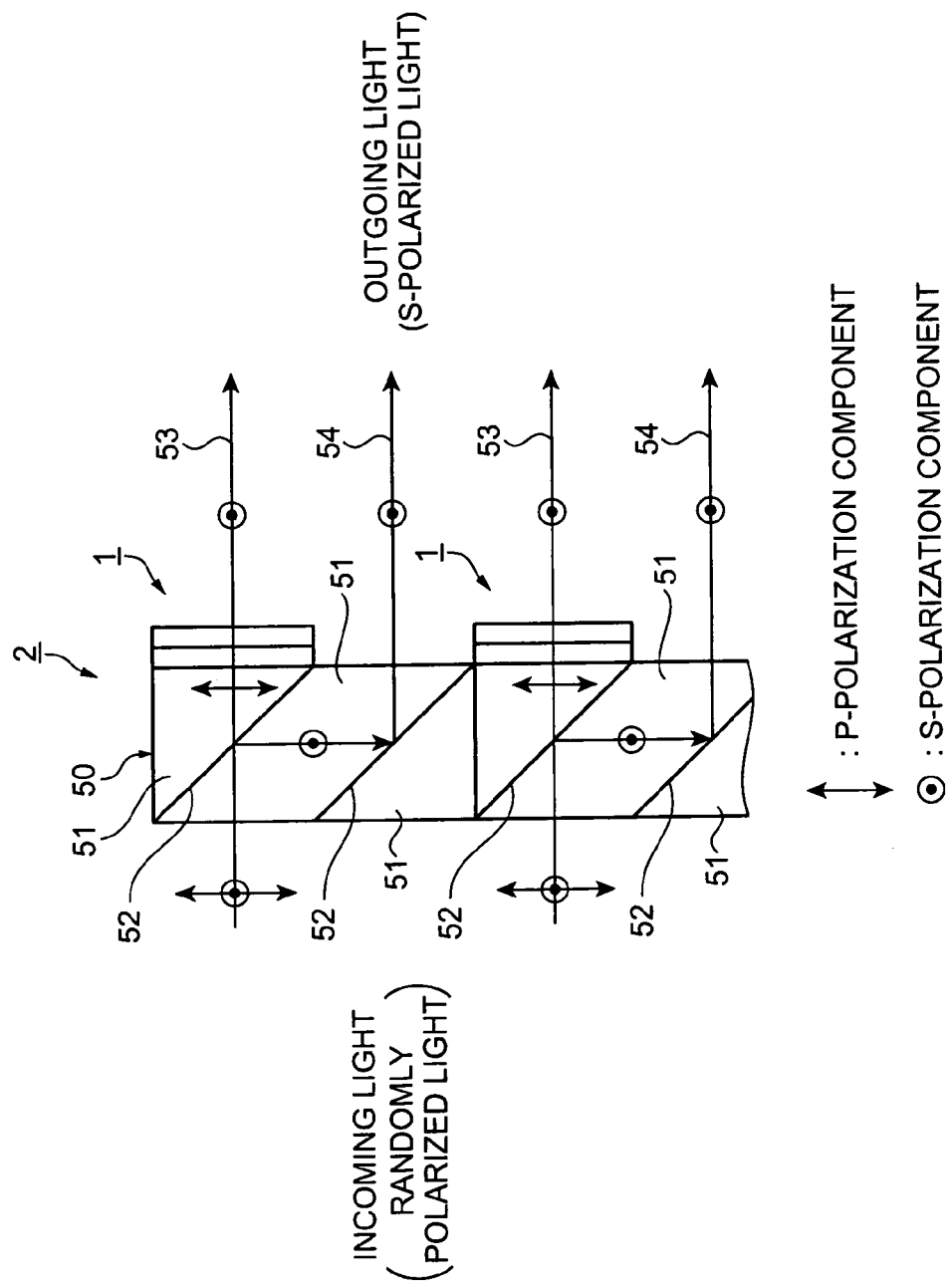
FIG. 10 is a main part configuration diagram of a PBS including a multilayered phase difference plate.

FIG. 10 is a main part configuration diagram of a polarization beam splitter (hereafter referred to as a "PBS") 2 capable of being used as a polarization conversion optical element and including the multilayered phase difference plate according to the first embodiment. As shown in FIG. 10 in the PBS 2, a prism array 50 having polarization split films 52 formed on slopes of prisms 51 made of glass or the like includes the multiple multilayered phase difference plates 1 in predetermined positions on the side of outgoing light. The PBS 2 has the following polarization conversion function: when randomly polarized light beams enter the PBS 2 as incident light from the left side of FIG. 10, the polarization components are directed to one direction in the PBS 2 and then go out to the right side of FIG. 10.

Hereafter, the polarization conversion function of the PBS 2 will be described. On a first path 53, when a randomly polarized incident light beam enters the PBS 2, a p-polarization component of the incident light beam transmits through a polarization split film 52 according to an optical characteristic thereof and then enters the multilayered phase difference plate 1. Then the p-polarization component is polarization-converted by the multilayered phase difference plate 1 so that the polarization plane is rotated by 90°. Thus, the p-polarization component goes out as an s-polarization component.

On a second path 54, an s-polarization component of an incident light beam is reflected by the polarization split film 52 toward a lower part of FIG. 10 and then reflected toward the right side by another polarization split film 52 located below the polarization split film 52 according to an optical characteristic thereof. Thus, the s-polarization component goes out while remaining as an s-polarization component. As a result, most of the randomly polarized light beams incident to the PBS 2 are polarization-converted into s-polarization components and then go out of the PBS 2.

Figure 11:
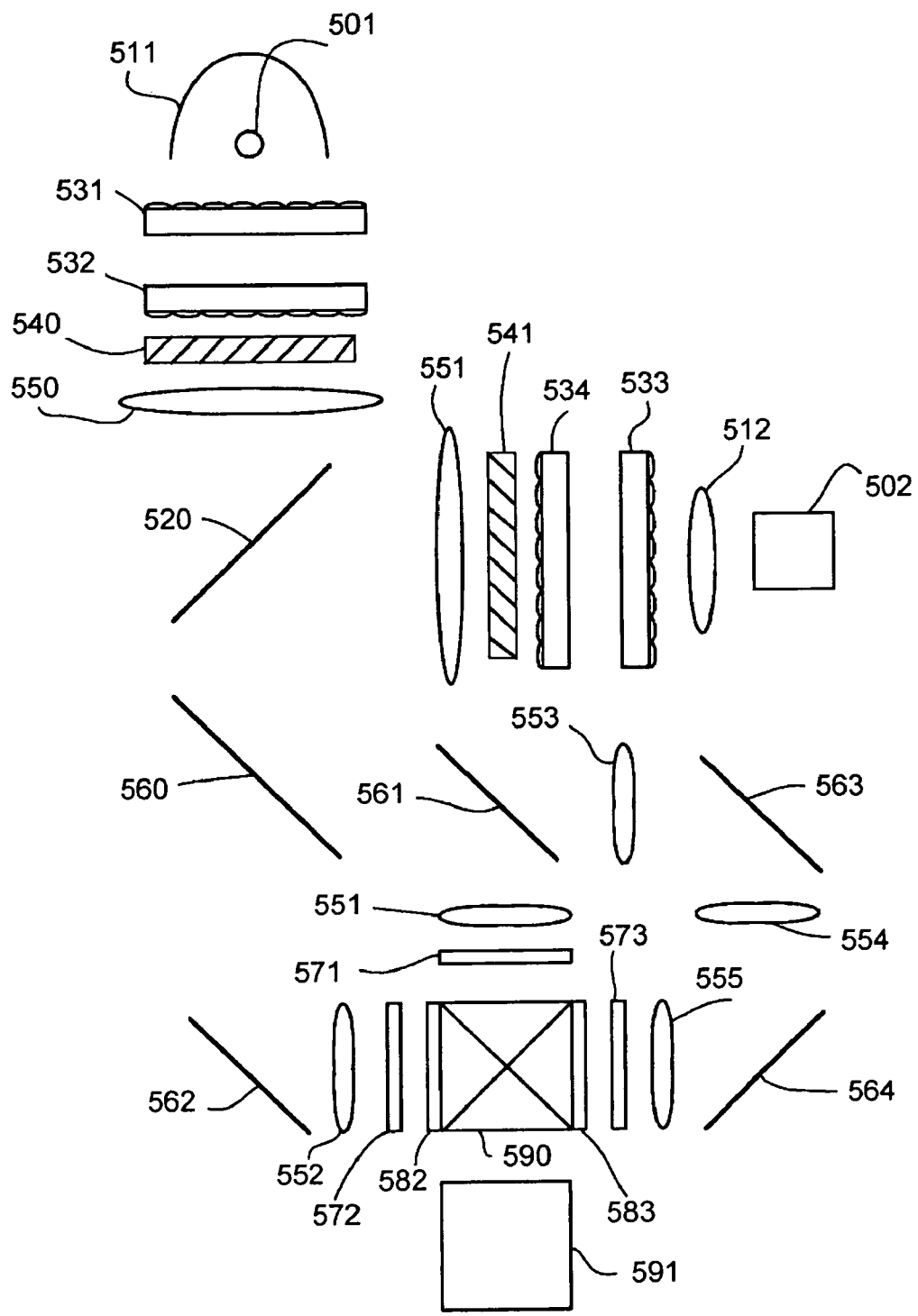
FIG. 11 is a main part configuration diagram of a projector including a multilayered phase difference plates.

Hereafter, one example of a projector including the above-described PBS will be described. FIG. 11 is a main part configuration diagram of one example of a projector including multiple light sources.

As shown in FIG. 11, the above-described PBS is used as a polarization conversion element 540 or a polarization conversion element 541. This projector includes a lamp 501 serving as a white light source, and a reflector 511. A light beam guided from this light source is dispersed or collected by a multi-lens 531, a multi-lens 532, and the like and then enters the polarization conversion element 540 including the above-described PBS. The above-described white light source is natural light in a wavelength range of approximately 400 nm to 700 nm. Therefore, by using the PBS including the multilayered phase difference plate 1 according to the first embodiment, the polarization conversion efficiency is increased, and the light beam from the light source is effectively used. As a result, a projector that provides excellent brightness is achieved.

A light source 502 shown in FIG. 11 is a single-color light source made of a light-emitting diode. A light beam guided from this light source is dispersed or collected by a multi-lens 533, a multi-lens 534, and the like and then enters a polarization conversion element 541 including the above-described PBS. This single-color light source provides light beams in any one of, for example, a blue wavelength range (approximately 400 nm to 500 nm), a green wavelength range (approximately 500 nm to 600 nm), and a red wavelength range (approximately 600 nm to 700 nm). A PBS favorable for such a polarization conversion element will be described in the following embodiment.

FIG. 11 is shown for illustrative purpose only and the invention described in this application is also favorably applied to a projector including only a white light source, which is a lamp, as a light source or a projector including only single-color light sources as light sources.

Second Embodiment

Multilayered phase difference plates according to embodiments below, including a multilayered phase difference plate according to a second embodiment, differ in the plate thickness range of the first and second phase difference plates and the optical axis azimuth range thereof from the multilayered phase difference plate according to the first embodiment. In the description of the embodiments below, the differences between these embodiments and the multilayered phase difference plate according to the first embodiment will be mainly described while commonly using FIGS. 1 and 2. Note that the reference numerals corresponding to the similar elements as shown in the first embodiment, FIGS. 1 and 2, are provided in parenthesis following the newly recited element numbers.

As generally shown in FIGS. 1 and 2, a multilayered phase difference plate 101 (1) according to a second embodiment includes a first phase difference plate 110 (10) and a second phase difference plate 120 (20). The multilayered phase difference plate 101 is formed in a manner that the plate thicknesses of the first and second phase difference plates 110 and 120 are in the range of 20.73 μm to 26.34 μm. The first and second phase difference plates 110 and 120 are formed in approximately the same plate thicknesses. The first and second phase difference plates 110 and 120 of the multilayered phase difference plate 101 are formed of Y-cut quartz crystal substrates In the multilayered phase difference plate 101, the optical axis azimuth θa of the first phase difference plate 110 and the optical axis azimuth θb of the second phase difference plate 120 are set according to Formulas (2) and (3), the Mueller matrix formula, and the like. Here, the settable ranges of the optical axis azimuths θa and θb in the range of the plate thicknesses of the first and second phase difference plates 110 and 120 are shown.

TABLE 3

| Plate thickness (μm) | θa(°) | θb(°) |
|---|---|---|
| 20.73 | 21.4 to 23.6 | 66.4 to 68.6 |
| 23.61 | 11.5 to 33.5 | 56.5 to 78.5 |
| 26.34 | 21.3 to 23.7 | 66.3 to 68.7 |

Table 3 shows the settable ranges of the optical axis azimuths θa and θb with respect to the above-described three plate thicknesses of the first and second phase difference plates 110 and 120. As shown in Table 3, for the plate thickness of 20.73 μm, which is the lower limit, the optical axis azimuth θa is in the range of 21.4° to 23.6° and the optical axis azimuth θb is in the range of 66.4° to 68.6°. For the plate thickness of 23.61 μm, which is approximately the center value, the optical axis azimuth θa is in the range of 11.5° to 33.5° and the optical axis azimuth θb is in the range of 56.5° to 78.5°. For the plate thickness of 26.34 μm, which is the upper limit, the optical axis azimuth θa is in the range of 21.3° to 23.7° and the optical axis azimuth θb is in the range of 66.3° to 68.7°.

Note that the value of the above-described optical axis azimuth θb is calculated on the assumption that the angle α formed by the optical axis azimuths θa and θb is 45°. Therefore, the optical axis azimuth θb is a value obtained by adding α to the set value of the optical axis azimuth θa. However, the angle α formed by the optical axis azimuths θa and θb is not limited to 45° and may be set to an angle other than 45° according to the combination of the plate thickness and the optical axis azimuth θa.

According to the above-described configuration, the multilayered phase difference plate 101 serves as a half-wavelength phase difference plate. Thus, when the linearly polarized light 30 as a p-polarization component of incident light enters the multilayered phase difference plate 101, the phase of the linearly polarized light 30 is shifted by 180°, thereby rotating the polarization plane by 90°. Thus, the linearly polarized light 30 is polarization-converted into the linearly polarized light 40 as an s-polarization component so that the linearly polarized light 40 goes out of the multilayered phase difference plate 101.

Figure 12:
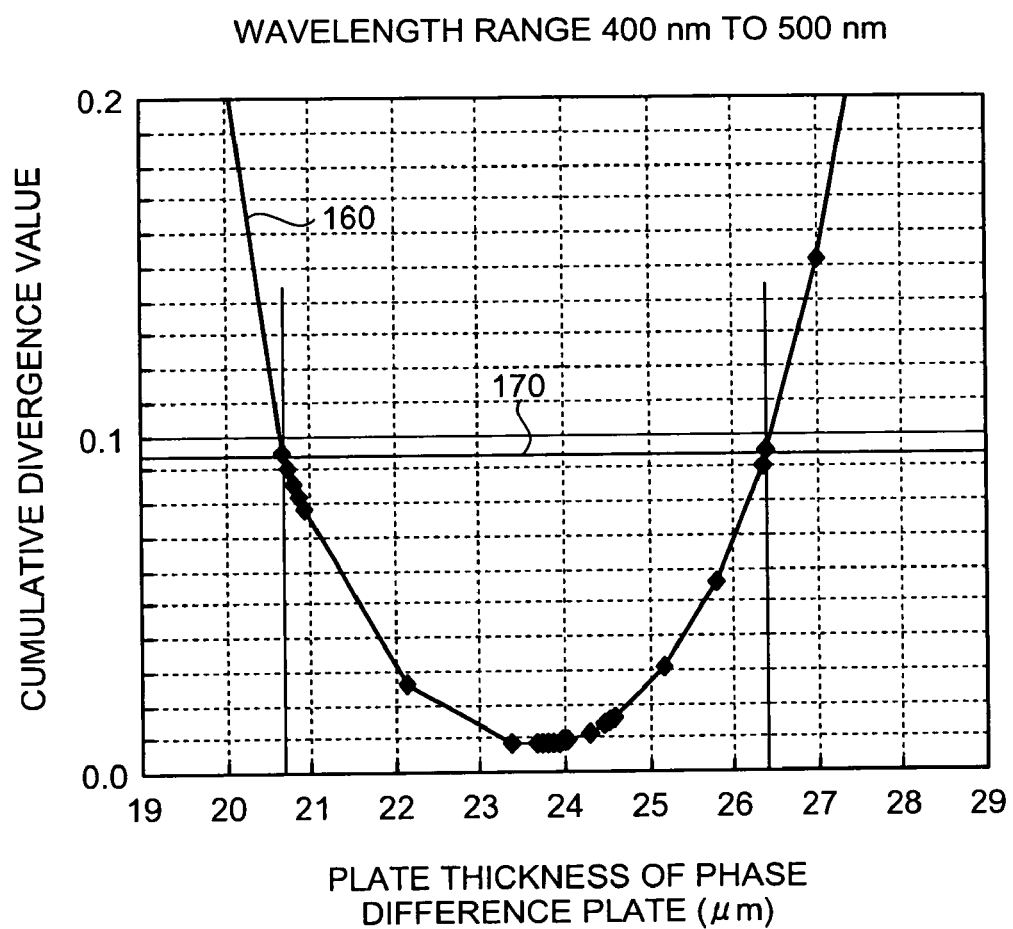
FIG. 12 is a graph comparing cumulative divergence values of a multilayered phase difference plate according to a second embodiment and cumulative divergence values of a related-art multilayered phase difference plate.

A result of a comparison between the efficiency of polarization conversion from the p-polarization component to the s-polarization component performed by the multilayered phase difference plate 101 and that of a related-art multilayered phase difference plate is shown in FIG. 12.

FIG. 12 is a graph comparing the polarization conversion efficiency of the multilayered phase difference plate 101 and that of the related-art multilayered phase difference plate in the wavelength range of 400 nm to 500 nm using the cumulative divergence value with respect to each plate thickness.

In FIG. 12, a curve 160 is a line obtained by linking the cumulative divergence values with respect to the plate thicknesses of the multilayered phase difference plate 101. A straight line 170 is a line obtained by plotting the cumulative divergence values of the related-art multilayered phase difference plate.

As shown in FIG. 12, it is understood that the cumulative divergence value of the multilayered phase difference plate 101 according to the second embodiment is smaller than that of the related-art multilayered phase difference plate when the respective plate thicknesses of the first and second phase difference plates 110 and 120 are in the range of 21 μm to 26 μm and therefore the multilayered phase difference plate 101 obtains a higher polarization conversion efficiency than that of the related-art multilayered phase difference plate.

The multilayered phase difference plate 101 obtains a higher polarization conversion efficiency in the range of 400 nm to 500 nm than that of the related-art multilayered phase difference plate. While the above-described optimization of the plate thickness range is on the assumption that the two phase plates are approximately the same, an even higher polarization conversion efficiency is obtained in the range of 400 nm to 500 nm by further optimizing the two plate thicknesses in view of Formula (1).

If the multilayered phase difference plate 101 according to the second embodiment is used in an optical element such as a PBS, like in the exemplary discussion regarding the multilayered phase difference plate 1 according to the first embodiment, and if incident light is in a blue wavelength range (approximately 400 nm to 500 nm), the polarization conversion efficiency is favorably increased.

Third Embodiment

As generally shown in FIG. 2, a multilayered phase difference plate 201 (1) according to a third embodiment includes a first phase difference plate 210 (10) and a second phase difference plate 220 (20). The multilayered phase difference plate 201 is formed in a manner that the plate thicknesses of the first and second phase difference plates 210 and 220 are in the range of 24.04 μm to 35.28 μm. The first and second phase difference plates 210 and 220 are formed in approximately the same plate thicknesses. The first and second phase difference plates 210 and 220 of the multilayered phase difference plate 201 are formed of Y-cut quartz crystal substrates.

In the multilayered phase difference plate 201, the optical axis azimuth θa of the first phase difference plate 210 and the optical axis azimuth θb of the second phase difference plate 220 are set according to Formulas (2) and (3), the Mueller matrix formula, and the like. Here, the settable ranges of the optical axis azimuths θa and θb in the range of the plate thicknesses of the first and second phase difference plates 210 and 220 are shown.

TABLE 4

| Plate thickness (μm) | θa(°) | θb(°) |
|---|---|---|
| 24.04 | 21.2 to 23.8 | 66.2 to 68.8 |
| 29.77 | −4.2 to 49.2 | 40.8 to 94.2 |
| 35.28 | 22.2 to 22.8 | 67.2 to 67.8 |

Table 4 shows the settable ranges of the optical axis azimuths θa and θb with respect to the above-described three plate thicknesses of the first and second phase difference plates 210 and 220. As shown in Table 4, for the plate thickness of 24.04 μm, which is the lower limit, the optical axis azimuth θa is in the range of 21.2° to 23.8° and the optical axis azimuth θb is in the range of 66.2° to 68.8°. For the plate thickness of 29.77 μm, which is approximately the center value, the optical axis azimuth θa is in the range of −4.2° to 49.2° and the optical axis azimuth θb is in the range of 40.8° to 94.2°. For the plate thickness of 35.28 μm, which is the upper limit, the optical axis azimuth θa is in the range of 22.2° to 22.8° and the optical axis azimuth θb is in the range of 67.2° to 67.8°.

The value of the above-described optical axis azimuth θb is calculated on the assumption that the angle α formed by the optical axis azimuths θa and θb is 45°. Thus, the optical axis azimuth θb is a value obtained by adding 45° to the set value of the optical axis azimuth θa. However, the angle α formed by the optical axis azimuths θa and θb is not limited to 45° and may be set to an angle other than 45° according to the combination of the plate thickness and the optical axis azimuth θa.

According to the above-described configuration, the multilayered phase difference plate 201 serves as a half-wavelength phase difference plate. Thus, when the linearly polarized light 30 as a p-polarization component of incident light enters the multilayered phase difference plate 201, the phase of the linearly polarized light 30 is shifted by 180°, thereby rotating the polarization plane by 90°. Thus, the linearly polarized light 30 is polarization-converted into the linearly polarized light 40 as an s-polarization component so that the linearly polarized light 40 goes out of the multilayered phase difference plate 201.

Figure 13:
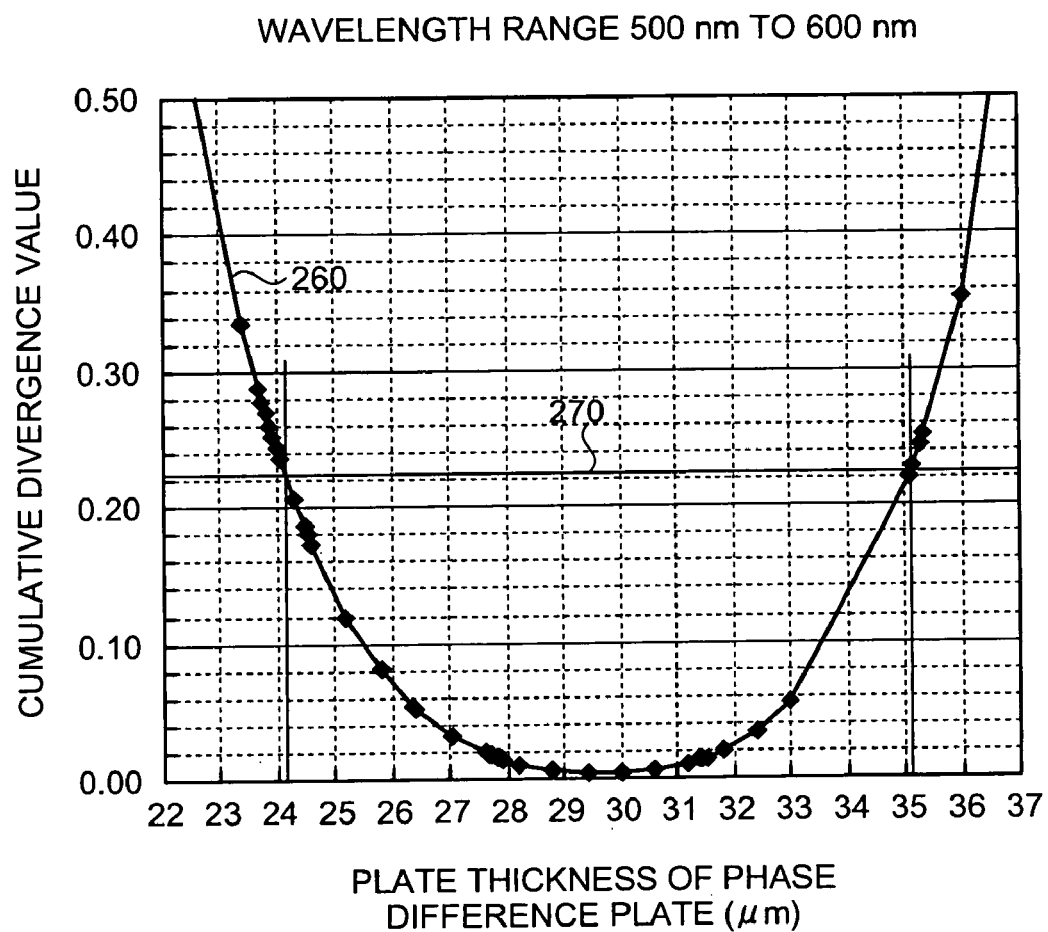
FIG. 13 is a graph comparing cumulative divergence values of a multilayered phase difference plate according to a third embodiment and cumulative divergence values of a related-art multilayered phase difference plate.

A result of a comparison between the efficiency of polarization conversion from the p-polarization component to the s-polarization component performed by the multilayered phase difference plate 201 and that of the related-art multilayered phase difference plate is shown in FIG. 13.

FIG. 13 is a graph comparing the polarization conversion efficiency of the multilayered phase difference plate 201 and that of the related-art multilayered phase difference plate in the wavelength range of 500 nm to 600 nm using the cumulative divergence value with respect to each plate thickness.

In FIG. 13, a curve 260 is a line obtained by linking the cumulative divergence values with respect to the plate thicknesses of the multilayered phase difference plate 201. A straight line 270 is a line obtained by plotting the cumulative divergence values of the related-art multilayered phase difference plate.

As shown in FIG. 13, it is understood that the cumulative divergence value of the multilayered phase difference plate 201 according to the third embodiment is smaller than that of the related-art multilayered phase difference plate when the respective plate thicknesses of the first and second phase difference plates 210 and 220 are in the range of 25 μm to 35 μm and therefore the multilayered phase difference plate 201 obtains a higher polarization conversion efficiency than that of the related-art multilayered phase difference plate.

The multilayered phase difference plate 201 obtains a higher polarization conversion efficiency in the range of 500 nm to 600 nm than that of the related-art multilayered phase difference plate. While the above-described optimization of the plate thickness range is on the assumption that the two phase plates are approximately the same, an even higher polarization conversion efficiency is obtained in the range of 500 nm to 600 nm by further optimizing the two plate thicknesses in view of Formula (1).

If the multilayered phase difference plate 201 according to the third embodiment is used in an optical element such as a PBS, like in the exemplary discussion regarding the multilayered phase difference plate 1 according to the first embodiment, and if incident light is in a green wavelength range (approximately 500 nm to 600 nm), the polarization conversion efficiency is favorably increased.

Fourth Embodiment

As generally shown in FIG. 2, a multilayered phase difference plate 301 (1) according to a fourth embodiment includes a first phase difference plate 310 (10) and a second phase difference plate 320 (20). The multilayered phase difference plate 301 is formed in a manner that the plate thicknesses of the first and second phase difference plates 310 and 320 are in the range of 23.98 μm to 47.41 μm. The first and second phase difference plates 310 and 320 are formed in approximately the same plate thicknesses. The first and second phase difference plates 310 and 320 of the multilayered phase difference plate 301 are formed of Y-cut quartz crystal substrates In the multilayered phase difference plate 301, the optical axis azimuth θa of the first phase difference plate 310 and the optical axis azimuth θb of the second phase difference plate 320 are set according to Formulas (2) and (3), the Mueller matrix formula, and the like. Here, the settable ranges of the optical axis azimuths θa and θb in the range of the plate thicknesses of the first and second phase difference plates 310 and 320 are shown.

TABLE 5

| Plate thickness (μm) | θa(°) | θb(°) |
| --- | --- | --- |
| 23.98 | 21.1 to 23.9 | 66.1 to 68.9 |
| 35.76 | 0.0 to 180.0 | 45.0 to 225.0 |
| 47.41 | 21.1 to 23.9 | 66.1 to 68.9 |

Table 5 shows the settable ranges of the optical axis azimuths θa and θb with respect to the above-described three plate thicknesses of the first and second phase difference plates 310 and 320. As shown in Table 5, for the plate thickness of 23.98 μm, which is the lower limit, the optical axis azimuth θa is in the range of 21.1° to 23.9° and the optical axis azimuth θb is in the range of 66.1° to 68.9°. For the plate thickness of 35.76 μm, which is approximately the center value, the optical axis azimuth θa is in the range of 0.0° to 180.0° and the optical axis azimuth θb is in the range of 45.0° to 225.0°. For the plate thickness of 47.41 μm, which is the upper limit, the optical axis azimuth θa is in the range of 21.1° to 23.9° and the optical axis azimuth θb is in the range of 66.1° to 68.9°.

The value of the above-described optical axis azimuth θb is calculated on the assumption that the angle α formed by the optical axis azimuths θa and θb is 45°. Thus, the optical axis azimuth θb is a value obtained by adding 45° to the set value of the optical axis azimuth θa. However, the angle α formed by the optical axis azimuths θa and θb is not limited to 45° and may be set to an angle other than 45° according to the combination of the plate thickness and the optical axis azimuth θa.

According to the above-described configuration, the multilayered phase difference plate 301 serves as a half-wavelength phase difference plate. Thus, when the linearly polarized light 30 as a p-polarization component of incident light enters the multilayered phase difference plate 301, the phase of the linearly polarized light 30 is shifted by 180°, thereby rotating the polarization plane by 90°. Thus, the linearly polarized light 30 is polarization-converted into the linearly polarized light 40 as an s-polarization component so that the linearly polarized light 40 goes out of the multilayered phase difference plate 301.

Figure 14:
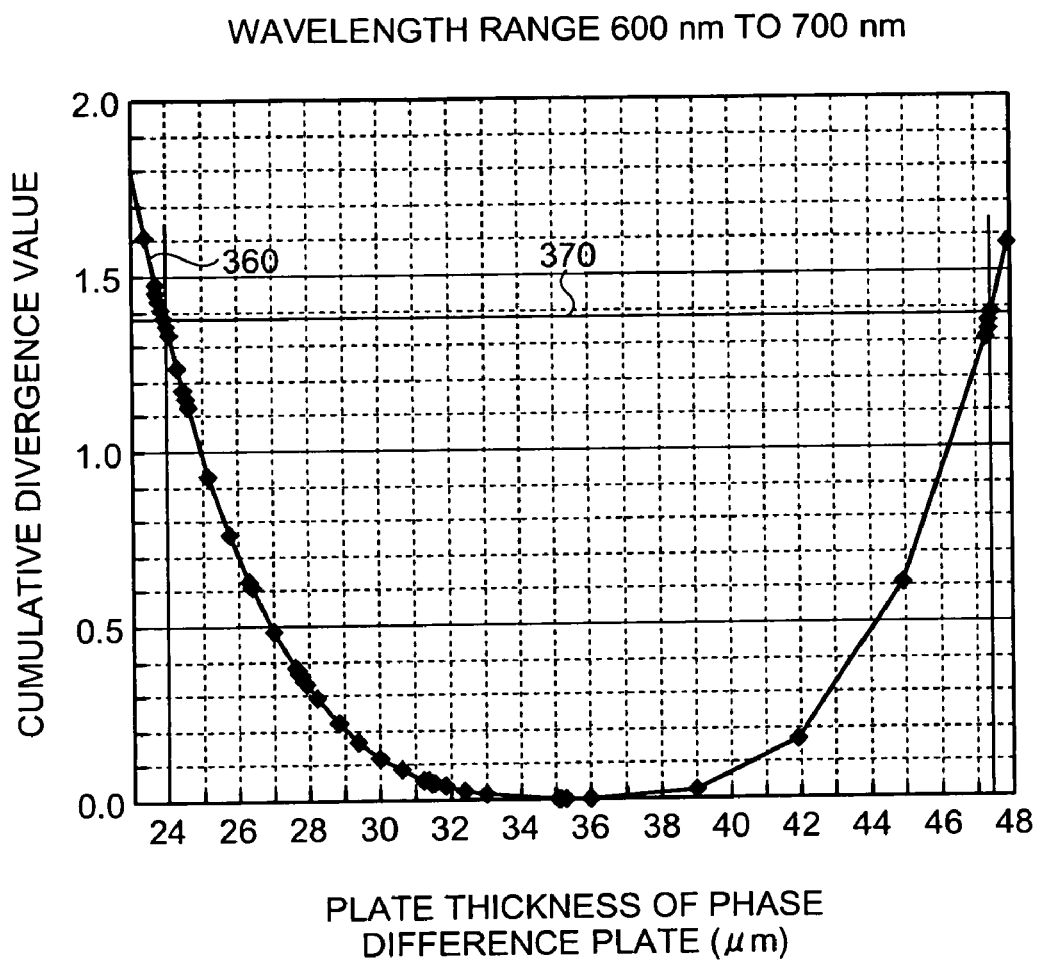
FIG. 14 is a graph comparing cumulative divergence values of a multilayered phase difference plate according to a fourth embodiment and cumulative divergence values of a related-art multilayered phase difference plate.

A result of a comparison between the efficiency of polarization conversion from the p-polarization component to the s-polarization component performed by the multilayered phase difference plate 301 and that of the related-art multilayered phase difference plate is shown in FIG. 14.

FIG. 14 is a graph comparing the polarization conversion efficiency of the multilayered phase difference plate 301 and that of the related-art multilayered phase difference plate in the wavelength range of 600 nm to 700 nm using the cumulative divergence value with respect to each plate thickness.

In FIG. 14, a curve 360 is a line obtained by linking the cumulative divergence values with respect to the plate thicknesses of the multilayered phase difference plate 301. A straight line 370 is a line obtained by plotting the cumulative divergence values of the related-art multilayered phase difference plate.

As shown in FIG. 14, it is understood that the cumulative divergence value of the multilayered phase difference plate 301 according to the fourth embodiment is smaller than that of the related-art multilayered phase difference plate when the respective plate thicknesses of the first and second phase difference plates 310 and 320 are in the range of 24 μm to 47 μm and therefore the multilayered phase difference plate 301 obtains a higher polarization conversion efficiency than that of the related-art multilayered phase difference plate.

The multilayered phase difference plate 301 obtains a higher polarization conversion efficiency in the range of 600 nm to 700 nm than that of the related-art multilayered phase difference plate. While the above-described optimization of the plate thickness range is on the assumption that the two phase plates are approximately the same, an even higher polarization conversion efficiency is obtained in the range of 600 nm to 700 nm by further optimizing the two plate thicknesses in view of Formula (1).

If the multilayered phase difference plate 301 according to the fourth embodiment is used in an optical element such as a PBS, like in the exemplary discussion regarding the multilayered phase difference plate 1 according to the first embodiment, and if incident light is in a red wavelength range (approximately 600 nm to 700 nm), the polarization conversion efficiency is favorably increased.

While the PBSs have been shown as applications for the multilayered phase difference plates 1, 101, 201, and 301 in the descriptions of the first to fourth embodiments, the applications are not limited thereto. For example, these multilayered phase difference plates may be used as a phase plate 572, a phase plate 573, or the like provided in the proximity of a cross prism 590 shown in FIG. 11.

What is claimed is:

1. A multilayered phase difference plate formed by bonding a first phase difference plate and a second phase difference plate together, the first and second phase difference plates being a plurality of quartz crystal plates, wherein:

an optical axis azimuth θa of the first phase difference plate, an optical axis azimuth θb of the second phase difference plate, and an angle α formed by the optical axis azimuths θa and θb have a relation of θb=θa+α, 0°<θa<45°, and 40°<α<50°, and a deviation amount of a phase difference of the first and the second phase difference plates satisfies the formula:

$$\Delta\Gamma b = \cos^{-1}\left(1 - \frac{(1-\cos(4\theta a))(1-\cos\Delta\Gamma a)}{(1-\cos 4(\alpha - \theta a))}\right),$$

where

Γa represents the phase difference of the first phase difference plate and is assumed to be 180°, ΔΓa represents the deviation amount of the phase difference Γa from a design target value, Γb represents the phase difference of the second phase difference plate and is assumed to be 180°, and ΔΓb represents the deviation amount of the phase difference Γb from a design target value.

2. The multilayered phase difference plate according to claim 1, wherein a plate thickness of the first phase difference plate is in a range of 24 μm to 31 μm and a plate thickness of the second phase difference plate is in a range of 24 μm to 31 μm.

3. The multilayered phase difference plate according to claim 1, wherein a plate thickness of the first phase difference plate is in a range of 21 μm to 26 μm and a plate thickness of the second phase difference plate is in a range of 21 μm to 26 μm.

4. The multilayered phase difference plate according to claim 1, wherein
a plate thickness of the first phase difference plate is in a range of 25 μm to 35 μm and a plate thickness of the second phase difference plate is in a range of 25 μm to 35 μm.

5. The multilayered phase difference plate according to claim 1, wherein
a plate thickness of the first phase difference plate is in a range of 24 μm to 47 μm and a plate thickness of the second phase difference plate is in a range of 24 μm to 47 μm.

6. A projector comprising
the multilayered phase difference plate according to claim 2.

7. A projector comprising
the multilayered phase difference plate according to claim 3.

8. A projector comprising
the multilayered phase difference plate according to claim 4.

9. A projector comprising
the multilayered phase difference plate according to claim 5.

10. A laminated phase difference plate comprising:
a first phase difference plate having a first phase difference Γa with respect to a wavelength λ; and
a second phase difference plate having a second phase difference Γb with respect to the wavelength λ, wherein
the first phase difference plate and the second phase difference plate are arranged and laminated such that their optical axes intersect each other,
the laminated phase difference plate converts incident light into converted linearly-polarized light by rotating a polarization plane of the incident light by 90 degrees and outputting the converted linearly-polarized light having a wavelength in the range from λ1 to λ2 such that λ1<λ<λ2,
an optical axis azimuth formed by the polarization plane of the incident light and the optical axis of the first phase difference plate is θa,
an optical axis azimuth formed by the polarization plane of the incident light and the optical axis of the second phase difference plate is θb,
the optical axis azimuths θa and θb have a relation of θb=θa+α, 0°<θa<45°, and 40°<α<50°, and
the first phase difference Γa and the second phase difference Γb have a relation of Γa=180°ΔΓa and Γb=180°ΔΓb, such that ΔΓa and ΔΓb satisfy the formula:

$$\Delta \Gamma b = \cos^{-1}\left(1 - \frac{(1-\cos(4\theta a))(1-\cos\Delta\Gamma a)}{(1-\cos 4(\alpha-\theta a))}\right).$$

11. The laminated phase difference plate according to claim 10, wherein the first and the second phase difference plates are formed of quartz crystal.

12. The laminated phase difference plate according to claim 11, wherein
a plate thickness of the first phase difference plate is in a range of 24 μm to 31 μm and a plate thickness of the second phase difference plate is in a range of 24 μm to 31 μm.

13. The laminated phase difference plate according to claim 11, wherein
a plate thickness of the first phase difference plate is in a range of 21 μm to 26 μm and a plate thickness of the second phase difference plate is in a range of 21 μm to 26 μm.

14. The laminated phase difference plate according to claim 11, wherein
a plate thickness of the first phase difference plate is in a range of 25 μm to 35 μm and a plate thickness of the second phase difference plate is in a range of 25 μm to 35 μm.

15. The laminated phase difference plate according to claim 11, wherein
a plate thickness of the first phase difference plate is in a range of 24 μm to 47 μm and a plate thickness of the second phase difference plate is in a range of 24 μm to 47 μm.

16. A polarization converter comprising:
a light-transmitting substrate that is flat and has a first main surface that is a light incidence surface and a second main surface that is a beam output surface;
first and second thin optical films disposed in the light-transmitting substrate; and
a phase difference plate disposed on the second main surface of the light-transmitting substrate, wherein
the first and second thin optical films are alternately arranged in parallel with a gap therebetween so as to be operably tilted about the first and second main surfaces of the light-transmitting substrate,
the first thin optical film separates a light input from the first main surface into a first linearly-polarized light and a second linearly-polarized light perpendicular to the first linearly-polarized light, and transmits and outputs the first linearly-polarized light from the second main surface while reflecting the second linearly-polarized light,
the second thin optical film reflects the second linearly-polarized light reflected by the first thin optical film and outputs the reflected second linearly-polarized light from the second main surface, and
the phase difference plate is the laminated phase difference plate according to claim 10.

17. A projector comprising:
a light source;
a polarization converter that converts a light from a light source into a linearly-polarized light and outputs the converted linearly-polarized light;
a modulator that modulates the light from the polarization converter on the basis of image information to be projected; and
a projection optical system that projects the light modulated by the modulator, wherein
the polarization converter is the polarization converter according to claim 16.

18. The projector according to claim 17, wherein the modulator is a liquid crystal shutter.

19. A projector comprising:
a light source;
a polarization converter that converts a light from a light source into a linearly-polarized light and outputs the converted linearly-polarized light;
a modulator that modulates the light from the polarization converter on the basis of image information to be projected;
a projection optical system that projects the light modulated by the modulator; and
a phase difference plate, wherein
the phase difference plate is the laminated phase difference plate according to claim 10.

* * * * *